United States Patent [19]
Land

[11] 3,892,477
[45] July 1, 1975

[54] VIEWER PROVIDING AUTOMATIC CASSETTE EJECTION

[75] Inventor: Edwin H. Land, Cambridge, Mass.

[73] Assignee: Polaroid Corporation, Cambridge, Mass.

[22] Filed: Jan. 2, 1974

[21] Appl. No.: 429,719

Related U.S. Application Data

[62] Division of Ser. No. 227,093, Feb. 17, 1972.

[52] U.S. Cl.................................. 352/74; 352/72
[51] Int. Cl........................................ G03b 23/02
[58] Field of Search............................. 352/72, 74

[56] References Cited
UNITED STATES PATENTS

| | | | |
|---|---|---|---|
| 3,139,789 | 7/1964 | Schrader | 352/72 |
| 3,575,421 | 4/1971 | Kato | 274/4 |
| 3,675,876 | 7/1972 | Frederick | 352/74 X |
| 3,787,114 | 1/1974 | Catalano | 352/72 X |

Primary Examiner—Monroe H. Hayes
Attorney, Agent, or Firm—David R. Thornton

[57] ABSTRACT

Projector apparatus employing a cassette-latching shaft member which automatically locates and locks a photographic cassette in an operative location responsive to insertion of the cassette in a cassette-receiving element of the apparatus. Displacement of the shaft member to its cassette-locking position allows engagement of other cooperating elements of the apparatus with the cassette and initiates operation of the latter through a preprogrammed sequence for projection including transport of the film in a forward and rewind direction. Following completion of the film rewind, the cooperating elements and the shaft member are automatically disengaged from the cassette, the latter is partially ejected and the apparatus turned off. The apparatus is also configured for operation of a multipurpose cassette which includes a processor station adapted to apply processing fluid to the film strip during its first rewind following exposure, and when the cassette is unprocessed, the apparatus automatically processes the cassette during the first film transport cycle and repeats the cycle prior to cassette ejection so as to program the latter through both a process and projection mode.

1 Claim, 7 Drawing Figures

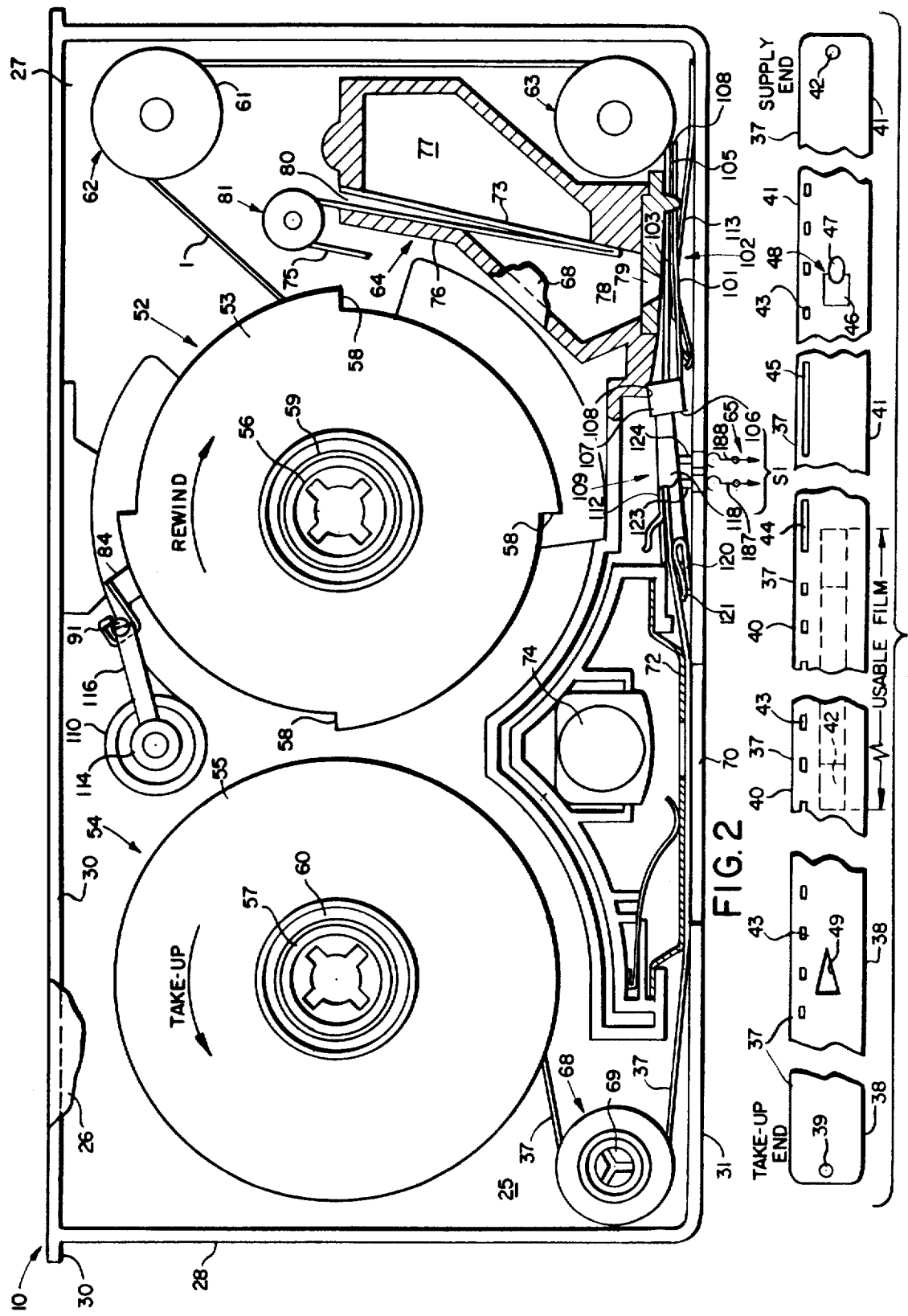

VIEWER PROVIDING AUTOMATIC CASSETTE EJECTION

CROSS REFERENCE TO RELATED APPLICATIONS

This application is a division of U.S. application Ser. No. 227,093 filed Feb. 17, 1972.

BACKGROUND OF THE INVENTION

1. Field of the Invention

This invention relates to photographic apparatus and, more particularly, to improved apparatus for automatically operating a multipurpose film handling cassette through preprogrammed sequences for both processing and projection.

2. Description of the Prior Art

Recent important technological advances have made it possible to provide multipurpose motion picture cassettes from which the film need not be removed during exposure, processing and projection operations. Exemplary of such new and unique systems are those described in prior U.S. Pat. No. 3,615,127 of Edwin H. Land issued Oct. 26, 1971; U.S. Pat. No. 3,537,784 of Rogers B. Downey issued Nov. 3, 1970; and U.S. Pat. No. 3,608,455 of Rogers B. Downey issued Sept. 28, 1971.

As indicated, each of the systems described in the aforementioned copending applications employ a cassette from which the film need not be removed during exposure, processing and projection operations. In these systems, the cassette is first operated in a camera for exposure of the film strip and then subsequently loaded into a projector apparatus which first subjects the cassette to a sequence of operations intended to process the film strip to a viewable condition and then subsequently projects the developed, recorded images.

Hence, the apparatus should be capable of operating the cassette in both a processing and projection mode. However, since the processing operation is performed on the film strip only once, that is, during the initial operation of the cassette by the processing-projecting apparatus, it is desirable that the apparatus omit operational sequences associated solely with film processing during subsequent cassette operations. Further, it is generally desirable to allow the processing operation of the cassette to proceed without interruption. Hence, it is important that the processing and projecting apparatus be preprogrammed to provide substantially fully automatic operation capable of uninterruptedly operating the cassette through a processing program which would include fluid deposition on the film strip and subsequent drying and projection.

Consequently, it is an important object of this invention to provide improved photographic apparatus for operation of a film handling cassette.

It is another primary object of this invention to provide improved photographic apparatus configured to receive a film handling cassette and to automatically operate the same through a preprogrammed sequence.

Still another object of this invention is to provide improved photographic apparatus for automatically and uninterruptedly operating a film handling cassette through a preprogrammed sequence.

A further object of this invention is to provide improved photographic apparatus for substantially automatic operation of a film cassette in both its processing and projection modes.

A still further object of this invention is to provide photographic apparatus for substantially fully automatic operation of a film handling cassette in response to receiving of the latter in an operative location.

An additional object of this invention is to provide improved photographic apparatus adapted for automatically locating and latching a film handling cassette in an operative position and for subsequently automatically operating it through a preprogrammed sequence.

SUMMARY OF THE INVENTION

The photographic apparatus of the present application is configured for operation of a motion picture film handling cassette wich includes a strip of motion picture film, a normally inoperative processing station, and a projection station, and said apparatus broadly comprises means for receiving such cassette in an operative relation with cooperative elements of said apparatus, means for latching such cassette in its operative location, and means for operating such cassette through a predetermined cycle responsive to its being received in said receiving means.

In its illustrated embodiment, the photographic apparatus is a rear projection viewer which includes a slot-like well configured to receive the cassette. Responsive to insertion of the cassette within the well, a shaft member is displaced laterally into the cassette to cam the latter into, and lock it in an operative position within the apparatus. Displacement of the latching shaft into its latching position automatically brings cooperating elements of the apparatus into operative engagement with the cassette and initiates the start of a preprogrammed operational sequence. Finally, at the completion of the preprogrammed sequence, the latching shaft and other cassette engaging elements are automatically withdrawn, the cassette is partially ejected from the well so as to be accessible for manual removal by the operator and the apparatus is shut off.

The cassette includes means for indicating the processed or unprocessed condition of its film strip and the apparatus is configured to cooperate with and respond to this indicating means so as to operate the cassette in either a processing-projection sequence or only a projection sequence. This is accomplished by apparatus configured for automatically transporting the film strip in both a forward and rewind direction and for then terminating the cassette operation. When the film strip has been previously processed, projection operation is carried out during this first forward run. However, if the film strip has not been previously processed, projection during the first forward transport is omitted and the film strip is processed during the immediate rewind. Then, the transport is automatically repeated with projection thereby allowing the film to be first processed and then projected. Consequently the apparatus is capable of automatically operating the cassette in either a processing-projection program or only a projection program and for terminating cassette operation subsequent to completion of either program.

Preferably, the apparatus is configured to cycle the cassette film so as to initially transport the film in a forward direction to the take-up spool and then rewind the entire length to the supply spool. Following rewind to the supply spool, the apparatus automatically disengages the latching shaft member and the driving elements, ejects the cassette and shuts off the apparatus. When the film strip is unprocessed, the apparatus automatically prevents projection during the first forward transport of the film and release of the shaft at the end of the first rewind (during which processing occurs) such that the cassette is then operated through an additional forward transport of the film for projection and a subsequent rewind at which time the termination of the program and ejection of the cassette occurs.

In its illustrated embodiment, the apparatus is intended for operation of a novel film cassette which contains a strip of film mounted for advancement. From a supply reel, the film strip extends through a normally inoperative processing station and across an exposure-projection opening. The processing station comprises a sealed container of processing composition, together with means for releasing the composition, and apparatus for applying the released composition in a uniform coat to the film, and is enabled in accordance with displacement of the latching shaft into the cassette and rewind of the film strip to the supply reel. The cassette also provides means indicative of the processed or unprocessed state of the film in the cassette. This signal is employed to select one of two operational modes of the projector apparatus.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 2 is a plan view of the film handling cassette of FIG. 1 partially cut away to show its interior;

FIG. 3 is a fragmentary plan view of the film strip employed in the cassette shown in FIGS. 1 and 2;

DESCRIPTION OF THE PREFERRED EMBODIMENT

The illustrated embodiment of this invention employs a multipurpose film handling cassette of the type described in the commonly assigned copending patent application Ser. No. 227,092 of John F. Batter, Jr. et al. filed herewith and entitled Processing Composition Release Mechanism for Film Cassette Comprising Self-Contained Film Processing System. Such a cassette is configured for use in a motion picture system in which the several operations of exposure, chemical processing, drying and projection of the recorded images is accomplished without transferring the film from its cassette. In this system, a motion picture film stored within a multipurpose cassette, is first exposed in a camera to record scene images thereon. Then, the cassette is loaded into a special purpose projector which first subjects the film strip to a processing treatment and thereafter drys the film strip and projects the recorded images thereon for viewing by an audience.

Figure 1:
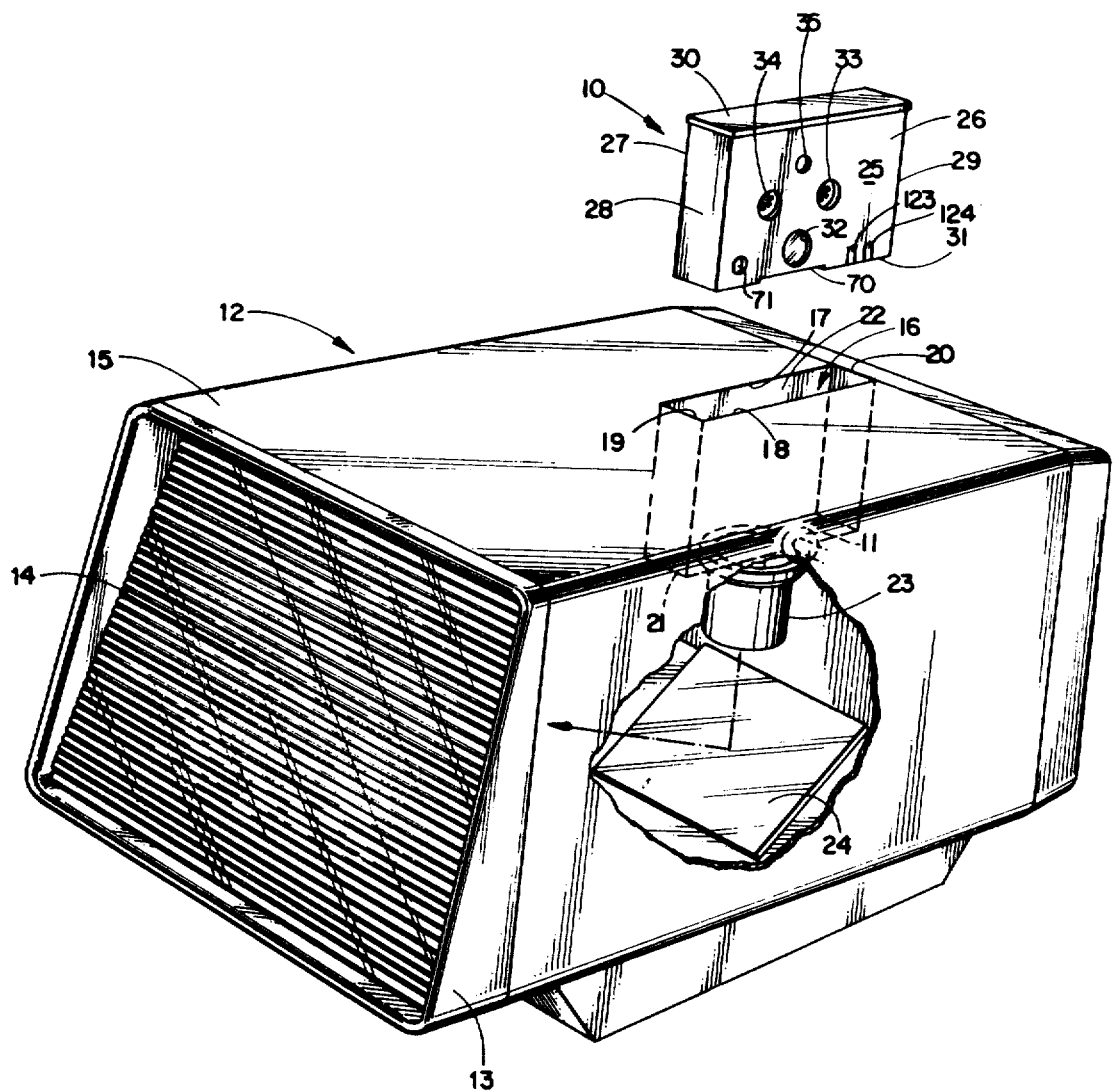
FIG. 1 is a diagrammatic view in perspective of a motion picture film handling cassette and a motion picture viewer embodying the features of this invention.

In the illustrated embodiment of this invention, which may be best understood by first referring to FIG. 1 of the drawing wherein a multipurpose film handling cassette 10 of the above-noted type is employed in conjunction with a projector apparatus 12 such as, for example, is described in the commonly assigned copending patent application Ser. No. 174,373 of Philip G. Baker et al filed Aug. 24, 1971. The projector 12 is illustrated as a rear projection viewer comprising a box-like housing 13 defined in part by a front viewing screen 14. Positioned rearwardly of the screen 14 in an adjoining relation to the top surface 15 of the housing 13 is a cassette-receiving slot or well 16 which extends to and is in communication with the top surface 15. In this embodiment, the well 16 is made up of side walls 17 and 18, end walls 19 and 20 and bottom wall 21 which together form a box-like, open ended slot 16 in communication with the top surface 15 through the open top 22 of the well. Mounted beneath the cassette-receiving well 16 is a projection lens assembly 23 and a reflector element 24 which in conjunction with a conventional projection lamp 11 is configured to project film images forwardly to the rear of the transparent screen 14.

In this figure, the cassette 10 is oriented over the cassette-receiving well 16 in proper position for loading within the receiving well. Loading is accomplished by moving the cassette downwardly to slide it within the receiving well 16 as later explained in detail with regards to FIG. 5.

As shown in FIG. 1, the cassette 10 comprises a generally parallelepiped casing or housing 25 constituted by a pair of planar side walls 26 and 27 joined together at their edges by end walls 28, 29 and elongated top and bottom edge walls 30 and 31. A plurality of apertures are located in side wall 26 to facilitate the cassette operation. Hence, an illumination aperture 32 is configured to permit entrance of illumination for projection purposes. Apertures 33, 34 and 71 permit access of external drive members, and aperture 35 is configured to receive a latching shaft of the apparatus for locating and locking the cassette within the well 16 as later explained in regard to FIG. 5.

Referring to FIG. 3, there is shown a film strip generally designated 37, which comprises a leader 38 terminating at an end formed with an aperture such as 39 which serves to connect that end of the film to a take-up spool shown in FIG. 2. Behind the leader 38, which may be in the neighborhood of 18 inches in length, there is a strip 40 of photographically useful film, upon which projectable images may be formed. The strip 40 may be, for example, approximately 52 feet in length for 8mm film.

Following the photographically useful portion 40 of the film strip 37 is a trailer region generally designated 41. The trailer 41 terminates at another end formed with an aperture 42 by means of which that end of the film is adapted to be connected to a supply spool, to be later described.

The film 37 may comprise a base of any suitable transparent material of the kind conventionally used for film bases. As indicated by the dotted lines, the film 37 is seen from the base side in FIG. 3, and the emulsion is on the opposite side. On this base is applied, at least over the central portion of the photographically usable length 40, an emulsion comprising a photosensitive coating, whereon a series of latent images illustrated by a series of frames 42 may be formed with a suitable camera. The photosensitive coating is preferably of one of the forms, next to be described, which can subsequently be processed to form a projectable image on the film base.

Photosensitive coatings usable in the practice of the invention may be of any conventional variety adapted to be developed by a monobath processing composition to form a positive transparency suitable for projection. In particular, a currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image.

A composite film assembly of this type, as well as processing compositions for producing a fully developed black and white image without the necessity of removing the developed negative image after processing, are shown in prior U.S. Pat. No. 2,861,885 to Edwin H. Land, which issued on Nov. 25, 1958, for Photographic Processes and Products. Other composite film assemblies capable of producing developed full color images without the necessity of removing the developed emulsion are shown in prior U.S. Patents of Edwin H. Land, Nos. 2,726,154 issued Dec. 6, 1955 for Photographic Product, and 2,944,894 issued July 12, 1960 for Photographic Processes Utilizing Screen Members.

Referring again to FIG. 3, the film 37 is formed along one edge with sprocket holes such as 43 at regular intervals adapted to cooperate with a drive pawl, in a manner to be described, in either a camera or projector, for incremental advancement of the film. The series of sprocket holes 43 adjacent the trailing end 41 of the film may be interrupted by a first elongated sprocket hole 44. This elongated hole 44 may span, for example, two of the sprocket holes 43. Further along the film in the direction of the supply reel end, the series of sprocket holes 43 is again interrupted by a second elongated sprocket hole 45, longer than the sprocket hole 44, and, for example, spanning three of the sprocket holes 43. The first elongated sprocket hole 44 establishes an exposure end point terminating advance of the film in the camera, whereas the second sprocket hole 45 determines a film take-up termination point in the projection apparatus 12 as later described in detail.

Cooperation of the sprocket holes 43 with the film drive pawl in a camera (not shown) is conventional. As is well known in the art, following the exposure of each frame of the film, the drive pawl engages one of the sprocket holes 43, advances the film by one frame length, and is then cammed out of engagement with the film. After being driven through a return stroke, the pawl enters the next succeeding sprocket hole in preparation for the next film advance movement.

When the first elongated sprocket hole 44 is encountered, the camera's film drive pawl will fail to engage the film, and film advance will terminate. This event may be signaled to the operator, so that the exposed cassette may be replaced with a fresh one, by the somewhat different sound produced when the pawl repeatedly skips the film. In addition, a frame counter may be provided to produce a visible indication when the film has been exposed.

As will appear, it is preferred to advance the film beyond the exposure termination point established in the camera as just described, before applying processing composition to the exposed film. For that purpose, a double film drive pawl (not shown) is employed in the illustrated projector apparatus 12. This double pawl comprises a pair of single pawls formed integrally and spaced to engage a pair of sequential sprocket holes 43 when driven in the same manner as the single pawl in the camera. Upon encountering the first elongated sprocket hole 44, one of the pawls forming the double pawl will engage the film, driving the film beyond the hole 44. However, upon encountering the second elongated sprocket hole 45, the double pawl will fail to engage the film, terminating film advance as in the camera, but at a point closer to the end of the film connected to the supply reel.

Formed on the trailing end 41 of the film 37, beyond the advance termination sprocket hole 45 just described, in the direction of the supply reel end of the film, is a singularity generally designated 48 comprising a detent engaging element here shown as an aperture 46 formed in the film, adjacent which a projecting bump 47 is formed, as, for example, by pressure and heat. The singularity 48 thus comprises a raised hook adapted to engage a detent in the form of a process control actuating element, to be described, as the film is moved with respect to the detent engaging element in the direction of the take-up reel. Formed on the leader end 38 of the film 37 is another detent engaging means, here shown as an aperture 49 in the central region of the film. This aperture serves to actuate a valve member forming a part of the processing apparatus to be subsequently described in regard to FIG. 2.

Within the housing 25, as shown in FIG. 2, a supply spool or reel 52 and a take-up spool or reel 54 are coplanarly mounted for rotation about parallel axes. Each spool 52, 54 includes a pair of flanges only the upper of which is shown at 53 and 55, to guide the film strip 37 as it is coiled on these spools. The lower flanges, which are hidden in this view, would be respectively identical to those shown. As previously indicated, the film strip 37 carries apertures 42 and 39 which are employed to connect the film ends to the spools 52 and 54 in a conventional manner.

As shown in FIG. 2, four unidirectional teeth 58 are formed on the periphery of the upper flange 53 of the supply spool 52. Corresponding teeth (not shown) are formed on the lower flange in registry with the teeth 58. These teeth are adapted to cooperate with an actuating arm, to be subsequently described, to effect the release of film processing composition in a manner to be described below.

Each flange carries a sprocket schematically indicated at 56 and 57, which may be formed integrally with the upper flanges 53 and 55 and adapt the spools to be driven about their axes of rotation. Of course, the sprockets 56 and 57 may protrude through the apertures 33 and 34 (FIG. 1) in the cover plate 26, light-baffled by suitable conventional annular portions (not shown) on the cover plate and on the upper surface of the flanges 53 and 55, as designated at 59 and 60, respectively.

Referring again to FIG. 2, the film 37 is initially in its unexpected state and coiled primarily about the supply spool 52. It is shown in FIG. 2 in the position assumed as it nears the end of its movement away from the supply spool 52, as toward the end of exposure in a camera, in which it is nearly exhausted from this spool.

In its path from the supply spool 52, the film 37 first encounters a conventional bobulator roll 62 and engages a portion of its periphery, as shown, and passes therefrom around a conventional idler roll 63 journalled for rotation in the housing, and thence through a film processing station 64, to be described below. In addition to the apparatus for processing the film 37 in a manner to be described, the film processing station 64 comprises a signal generator generally designated 65 for producing an external condition signal on terminals schematically indicated at 187 and 188, to indicate whether or not the processing means has been actuated.

Beyond the film processing station 64, the film 37 extends across an opening 70 which functions at different times for exposure and projection. The film 37 next passes over a conventional snubber roll, generally designated 68, and finally passes to the take-up spool 54.

In this arrangement, the opening 70 permits image bearing light rays to impinge on progressive incremental sections of the film strip 37 when the cassette is operated in a camera (not shown) and to subsequently permit light rays from an external source to be directed through the incremental sections of the film strip and outwardly of the cassette for projection operations when the cassette is operated in the projector apparatus 12. Hence, the opening 70 first comprises an exposure station and subsequently a projection station of the cassette 10. To facilitate these functions a pressure plate 72 and a prismatic reflector element 74 are mounted behind opening 70.

The bobulator 62 may be of any conventional construction, and performs the known function of isolating the film drive pawl associated with a camera, or the double pawl discussed above that is associated with the illustrated viewer apparatus 12, from the inertia of the supply spool 52. For this purpose, the bobulator 62 comprises a roller 61 mounted in any conventional manner on a pivot that is in turn mounted on a support, not shown, movable with respect to the side wall 27 and biased by a spring, such that the bobulator roll 61 can both rotate, and be moved backwards and forwards in the directions of the double arrow shown in FIG. 2.

The bobulator roll thus responds to increases or decreases in the tension of the film 37 by temporarily shortening or lengthening the film path, respectively. Such changes in film tension are produced by the actuation of the film drive pawl and are determined by the inertial forces exerted by the supply spool 52, together with the larger or smaller supply of film that may be on it at any given time. By that arrangement, as the film is advanced incrementally by the pawl associated with the camera or projector, it can rapidly move the bobulator roll 61 against its relatively light spring without immediately affecting the supply spool, which can then more or less gradually allow the bobulator roll to relax while supplying the segment of film taken by the pawl.

The snubber roll 68 is illustrated, may be provided with a hub portion schematically indicated at 69 that is adapted to protrude through a suitable light-baffled aperture 71 in the cover panel side wall 26 (FIG. 1) for engagement by a stop member (not shown) comprising a part of either the camera or of the projector 12 that is engaged when the film is to be incrementally advanced by a pawl for exposure or projection purposes. The operation of the snubber roll 68 is a conventional arrangement which isolates the frame by frame advancement of the film, across the exposure-projection opening 70 from the take-up spool 54 as subsequently described.

The drive sprockets 56 and 57 of the supply and take-up reels 52 and 54, respectively, are adapted to be engaged by corresponding drive sprockets comprising a part of a camera, or of the projector apparatus 12 to be described. In the latter apparatus, both the supply and take-up spools are adapted to be driven through slip clutches. In the camera, only a drive for the take-up spool need be provided, and may comprise a slip clutch connected to a drive shaft (not shown) for driving the take-up spool drive sprocket 57, in cooperation with a drive pawl sequentially engaging a series of the sprocket holes 43 of the film 37, along a portion of the film in the cassette opening 70. When the snubber roll 68 is stopped by engagement of its hub 69 with an appropriate external member (not shown), operation of either the camera or of the projector apparatus to incrementally advance the film towards the take-up spool 54, by engagement of a pawl with the sprocket holes in the film 37, will momentarily loosen the film from engagement with the stationary snubber roll and allow the slip clutch driving the take-up spool to take up that increment of the film advanced by the pawl. Accordingly, between engagements of the pawl, the slip clutch prevents the take-up spool from advancing the film and from thereby interfering with the pawl advancement.

In the projector apparatus 12 to be described, the snubber roll 68 is engaged only while the film strip 37 is to be incrementally advanced onto the take-up spool 54. When the film strip 37 is rewound onto the supply spool 52, the snubber roll 68 is disengaged and acts as an idler. As will appear, that may occur either during the processing of the film while rewinding, or during subsequent rewinding of the processed film after projection.

The film processing station, fragmentarily shown in FIG. 2 generally comprises wall means, comprising portions of, or formed integral with, the side wall 26 and 27 of the cassette housing 25, which constitute a housing 76 retaining a source of processing fluid or composition 77 within an internal chamber 78. The container 78 communicates with a coating nozzle generally designated 79. These elements are mounted above the plane of the film 37.

The initially sealed container 78 comprises a tub-like receptacle of a suitable plastic or the like selected to resist interaction with the processing composition, or permeation thereof by ambient gases and is formed on an open side with a circumscribing flange 71 which is sealed to initially contain the processing composition 77 by one end 73 of a tear-tab generally designated 75. The tear-tab 75 may be made of any suitable plastic material, or the like, selected to resist the action of the composition 77 and to avoid interaction therewith, as well as to prevent the diffusion into the composition of gases such as oxygen, carbon dioxide, carbon monoxide, water, oxides or hydrides of sulfur or nitrogen, or the like, that might modify its composition. The end 73 is sealed to the plane surface of the flange 71 surrounding the opening formed on the receptacle 78 by any suitable means such as heat sealing, or a suitable adhesive, or the like. The tear-tab 75 extends, from the receptacle 78, back upon itself, out through an aperture 80 and over an idler 81 journalled in the housing, to an actuating assembly, next to be described below.

Figure 4:
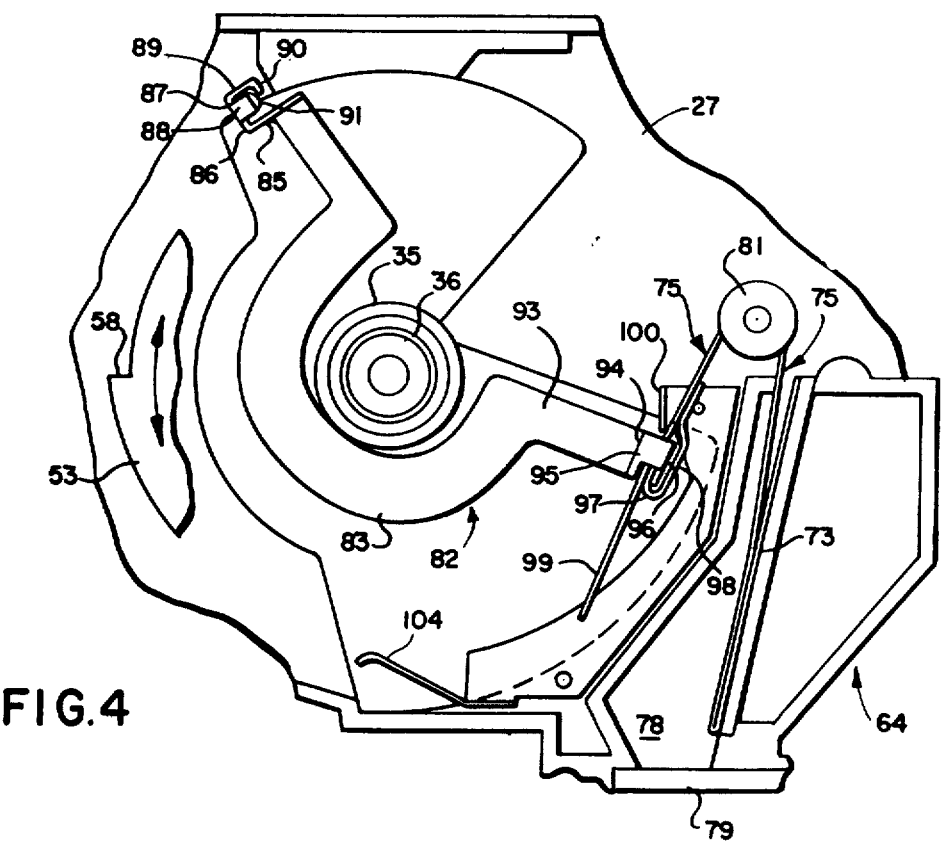
FIG. 4 is a fragmentary plan view with parts omitted and parts broken away of a portion of the cassette of FIG. 2.

Comparing FIGS. 2 and 4, the supply reel 52 in part overlies an actuating arm generally designated 82 having a curved central portion 83 that extends around the flange 53 with clearance to a first arm 84 terminating in an upstanding flange 85. The flange 85 is bent up to form a ledge 86 adapted to engage one of the teeth 58 on the flange 53 of the supply spool 52 in a manner and for purposes to be described. An extension 87 of the ledge 86 is formed with an inclined tab 88 that is bent over as shown to form a cam surface for purposes to be described. The extension 87 is also bent to form portions 89 and 90 that comprise a hook adapted to engage an upstanding post 91 formed integral with the cassette wall 27 to hold the arm 82 in an initial position disengaged from the spool 52. Portion 87 of the hook is also formed with a bottom slot not shown, which permits the hook to ride over the post 91 when the arm 84 is urged to the right as viewed in FIGS. 2 and 4. The latter displacement of the arm 82 is accomplished by a cam member 114, which as shown in FIG. 2 is displaceably mounted in a sleeve 110 of the cassette wall 27 with a cam arm 116 in engagement with the tab 88. The cam 114 is located in alignment with the latching shaft aperture 35 (see FIG. 1) and spring biased by conventional means (not shown) towards the latter such that insertion of the latching shaft 120 of the apparatus 12 into the cassette 10 (as later explained in regard to FIG. 6) displaces the cam 114 inwardly such that its cam arm 116 in cooperation with the inclined tab 88 forces the arm 82 clockwise over the post 91. This releases the arm 82 and engages its ledge 86 with the flange 53 so as to initiate the processing operation as subsequently explained.

Referring again to FIG. 4, the other end of the arm 82 is formed with an extension 93 terminating in an upstanding portion 94 to form a horizontally-extending flange 95 which is bent again to form a downwardly extending loop or hook 96. The latter extends over a spring member 99 and within a loop 98 of the tear-tab 75. The spring 99 biases the actuating arm 82 towards the right so as to initially latch it on the post 91 and to subsequently force its ledge 86 against the spool flange 53 upon its release from post 91.

As will appear, when the cassette 10 is inserted into the wall 16 of the projector apparatus 12, the locating pin 130 is adapted to enter the aperture 35 and drive the cam block 114 inwardly to release the actuator arm 82 from the post 91. That frees the arm 82 to move downwardly and to the right in FIG. 2, under the influence of the spring 99, to bring the ledge 86 in position to be engaged by one of the teeth 58 formed on the flange 53 of the supply spool 52. Subsequent rotation of the spool 52 in a rewind (clockwise direction) pivots the arm 82 in this direction so as to tear open the pod 78 and dump its fluid 77 to the nozzle 79 for coating the film strip during its transport. That is, the arm 82 is initially in engagement with the post 91, so that the ledge 86 is out of the way of the teeth 58 formed on the supply spool 52, allowing the supply spool to rotate in either direction without actuation of the arm 82. That position of the parts prevails during exposure of the film in the camera, while the film is transferred from the supply reel to the take-up reel, and is maintained when the cassette is removed from the camera. When the cassette is placed in the projector apparatus 12, to be discussed below, the locating pin 130 will enter the aperture 35 and release the arm 83 from the post 91. It should be noted that with the arm 82 out of engagement with the post 91, the film 37 may still be advanced further onto the take-up spool 54 without any substantial movement of the arm 82 since the supply spool 52 is rotating clockwise as viewed in FIG. 2. That is, because the rims of the spool flange 53 rise gradually to the teeth 58, the latter teeth pass the ledge 86 without engagement during counterclockwise rotation. However, when the film is returned to the supply reel, with subsequent rotation of the supply spool 52 clockwise, one of the teeth 58 will engage the ledge 86, and rotate the arm 82 clockwise so as to carry the end of the tear-tab on which the loop 98 is formed downwardly. The tear-tab 75 will now become at least partially detached from the receptacle 78, allowing its processing composition 77 to flow to the orifice 79.

As the arm 82 continues to rotate, the hook 96 and the loop 98 formed on the tear-tab will engage the spring 104 (See FIG. 4), driving the arm 82 upwardly and to the right, in which position the arm will then be held out of engagement with the spool 52 which can thereafter be rotated in either direction without further interaction with the arm 82.

Other elements of the processing apparatus will next be described with reference to FIG. 2 wherein a pressure pad assembly 102 is shown in the initial position assumed upon assembly of the cassette and prior to processing of the film strip 37. As shown in this figure, the film 37 normally passes below the nozzle 79, and above a normally disengaged film engaging pad surface 103. The pad surface is an upwardly extending and generally rectangular protrusion in a base plate 101 and may be made of any suitable conventional material, such as stainless steel or the like having the raised surface 103, formed by diestamping or the like which is ground or otherwise finished with a film engaging plane that is adapted to mate, through the film 37 with the plane of the nozzle 79 and generally conform to the working area (not shown) of the nozzle. The pad assembly 102 is mounted on and biased towards the nozzle 79 by a leaf spring 113. The pressure pad assembly 102 is formed at one end 108 with a protuberance 105 that is adapted to lightly engage the base side of the film 37 and to cooperate with aperture 46 of the film for purposes to appear. Formed adjacent the other end 106 of the plate 101 and extending upwardly therefrom, are a pair of ears only one of which is shown at 107, and which are adapted to extend up past the film 37 on either side to initially engage the underside of the nozzle 79 in the recess 108 so as to displace the pad 102 into film engagement as the film is further advanced onto the supply spool 54 in the projector 12 as later explained in detail.

Displaceably mounted in conjunction with the end 106 of the pad assembly 102 is pressure pad depressing cam and nozzle plate assembly 109 which comprises a plane base plate 112 configured to close the nozzle at the end of the processing operation in a manner to be described. Formed as orthogonal extensions on the side of the base plate 112 are a pair of depending cams, only one of which is shown at 118, that serve at times to depress the pressure pad assembly 102 in a manner to appear below. Toward the left end of the plate 112, as shown in FIG. 2, is formed an arm 120 that extends downwardly to provide a spring arm extension 121 which is configured to engage the film aperture 49 and displace the valve 109 into its closed position as the film is completely rewound on the supply spool 52 in the projector 12 as later explained.

The cam portion 118 of the assembly 109 is of metallic conducting material and is adapted to cooperate with a pair of contacts or terminals 123 and 124 which extend to the cassette's outer surface as illustrated in FIG. 1. These terminals 123 and 124 of the cassette 10 together with the valve 109 form a signal generator or that is, means for indicating whether or not the film strip 37 has been processed. For this purpose, in the initial position of the parts shown in FIG. 2, assumed before the processing cycle is started, the cam 118 engages both contacts 121 and 122 and thus bridges them to supply continuity therebetween and thus an external signal which indicates by their bridged condition that the film is not processed. As will appear, at the end of the processing cycle, the valve assembly 109 will be carried to the right (not shown) thereby opening the contacts 121 and 122 to cause an open circuit to be presented to the terminals 123 and 124, indicating that the film has been processed. Further, as later explained, the indicating means provided by contacts 121, 122 and valve 109 are utilized to control the programmed sequence in the projector 12.

As previously indicated, the cassette 10 is initially mounted in an appropriate camera, not shown, with the drive means of the latter engaging the hub 57 of the take-up spool 54. At this time, the film is incrementally transported frame by frame by a conventional single claw or the like across the opening 36 and to the take-up spool 54 for exposure of the film to the scene being photographed by the operator. Following exposure, the cassette 10 is inserted in well 16 of the viewer 12. Responsive to this insertion, as later explained in detail in regard to FIGS. 5, 6 and 7 the viewer is turned on, the cassette 10 is automatically located and locked in an operative position, and operated through a preprogrammed sequence to both process the film strip and to project the recorded images thereof. At the completion of the program, the viewer automatically releases and ejects the cassette and shuts itself off.

Figure 7:
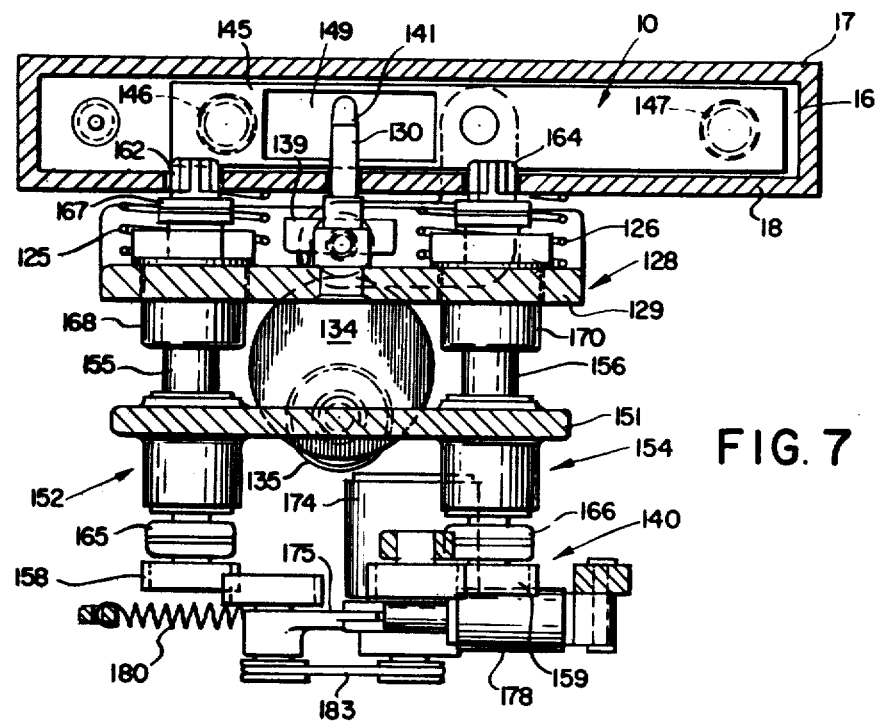
FIG. 7 is a top view of the operational elements shown in FIG. 5.
Figure 5:
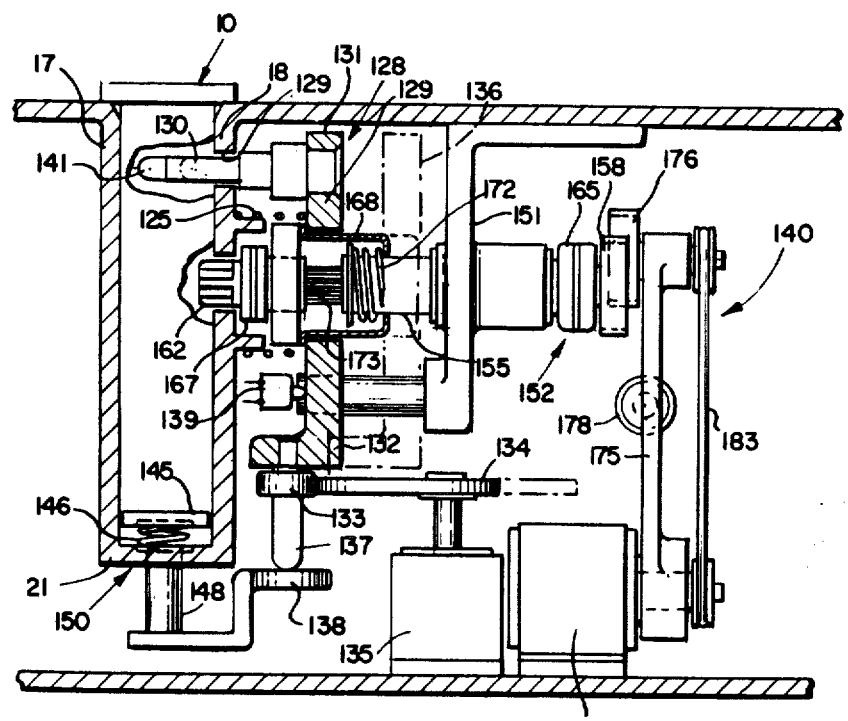
FIG. 5 is a view in elevation of some of the operational elements of the apparatus shown in FIG. 1.

As shown in FIGS. 5 and 7, a cassette-latching mechanism 128 is mounted alongside the side wall 18 of the well 16 and in communication with the latter through an opening 129 thereof. Mounted beneath the cassette-latch mechanism 128 are a spool drive mechanism 140 and a cassette-eject mechanism 150. Each of these mechanisms is automatically operated, in sequence, to program the cassette through a suitable operation. Hence, as subsequently explained in detail, upon insertion of the cassette 10 in the well 16, the latch mechanism 128 is initially operated to locate and lock the cassette in its operative position within the well. This latch mechanism 128, in turn, initiates or controls substantially all the other mechanisms of the viewer apparatus, and failure of the latch mechanism 128 to properly lock the cassette in place prevents their subsequent operation.

As shown in FIG. 5, the latch mechanism 128 includes a vertically oriented support plate 129 which carries a latching shaft 130 at its upper end 131. The lower end 132 of the plate 129 carries a cam follower 133, mounted on a depending shaft 137, in engagement with a cam 134. The latter is coupled to and rotated by a motor 135 to suitably displace the latch mechanism 128 from a first position, shown dotted at 136, to its latching position illustrated in bold lines in this figure. The motor 135 is a step motor or the like configured to drive the cam 134 through a one-half revolution and then disrupt (through a suitable switch means, not shown) the circuit which is energizing it, as later explained, at the completion of the program it is again triggered for one-half revolution and automatically shuts itself off. Additionally, as shown in FIG. 7, a pair of springs 125 and 126 bias the plate 129 outwardly from the well 16 and keep the cam follower 133 in engagement with the cam 134.

Referring again to FIG. 5, the depending shaft 137, upon which the cam follower 134 is mounted, also extends to an arm member 138 of the cassette-eject mechanism 150 and controls the operation of the latter in that so long as the latch mechanism 128 is in its latch position the arm member 138 is held depressed as shown. Movement of the cassette-latch mechanism 128 to its cassette release position 136 as later explained disengages the shaft member 137 from arm 138 and permits the latter to move upwardly in accordance with operation of the cassette eject mechanism 150. A normally open switch 139, mounted on the wall 18 by any conventional means not shown, is configured to energize the drive mechanism 140 and all other circuits to initiate the programmed operation of the cassette 10 as later explained. In this regard, the switch 139 is adapted to be engaged by and closed in accordance with displacement of the latching mechanism 128 to its latch position as shown. Additionally, the latching shaft 130 carries a cone shaped cam surface 141 which engages the cassette aperture 35, or that is, side wall portions thereof (see FIG. 1) to pilot or cam the cassette 10 into an operative position in the well 16. Additionally, the latch mechanism 128, as later explained with regard to the drive mechanism 140, holds the latter in a disengaged position until the cassette is properly seated and locked in the well 16. Hence, it should be understood that the latch mechanism 128 not only provides means for locating the cassette in its operative position and for subsequently latching or locking it in this position but also in conjunction with the switch 139 provide means precluding engagement of other operative components with the cassette and for precluding actuation of the operational program until the latch mechanism is fully displaced to its cassette-latching position.

Figure 6:
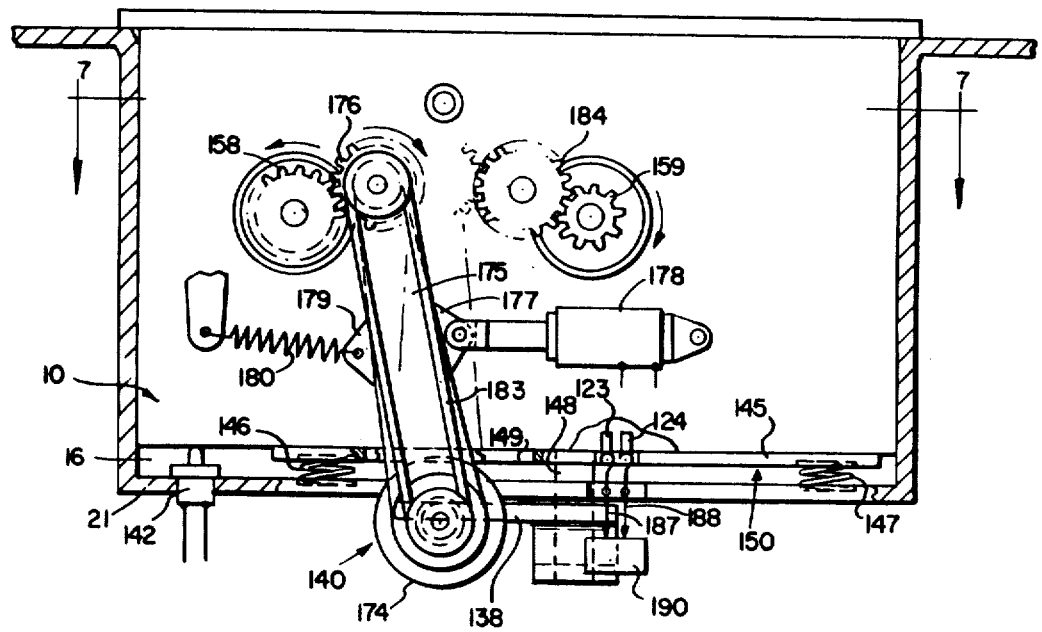
FIG. 6 is a side view illustrating the operation of the spool drive system illustrated in FIG. 5.

As shown in FIG. 6, a switch 142 is mounted at the base 21 of the well 16 and is configured to be engaged by the cassette 10 during insertion of the latter. The switch 142 is a normally-open switch which is connected to the cam drive motor 135 and adapted to trigger the latter into operation to drive the cam 134 through a one-half revolution and thereby drive the latching shaft 130 into the cassette as the latter is positioned in the well 16. Hence, the switch 142 in conjunction with the latch mechanism provides means for energizing the viewer apparatus 12 responsive to positioning of the cassette 10 in the apparatus.

Displaceably mounted on the bottom wall 21 of the well 16 is the eject mechanism 150. This comprises a plate 145 mounted on a pair of compression springs 146 and 147. Affixed to the underside of the plate 145 is a depending rod or arm 148 which terminates in the eject latch member 138. The plate 145 includes a centrally located open portion indicated at 149 which permits access of the projection opening 70 (see FIG. 1) to both an aperture plate and a conventional claw mechanism (not shown). In operation of the eject mechanism 150, the cassette 10 engages the plate 145 and carries it along with the springs 146 and 147 downwardly to a cocked position (as illustrated) where the arm 138 (see FIG. 5) of the latch mechainsm 128 holds it, as later explained in detail, until the cassette program is completed.

The drive mechanism 140 will now be described. As shown in FIG. 7, the drive mechanism 140 includes a pair of shaft assemblies 152 and 154 which are rotatably journaled in a frame portion 151. Each shaft assembly 152 and 154 includes a shaft 155 and 156, respectively, which extend outwardly to suitable gears 158 and 159 later described in regard to FIG. 6. Included on each shaft 155 and 156 respectively are conventional clutch arrangements 165 and 166. Additionally, at the forward end of the shafts 155 and 156 are spool drive shafts or spindles 162 and 164 which are adapted to engage and mate with the spool hubs 57 and 56, respectively, of the cassette 10 responsive to displacement of the latch mechanism 128 to its cassette latching position as explained below.

The spool drive spindle 162 which is adapted for engagement with the take-up spool hub 57 carries a motion detector switch 167 operable as later explained with regard to FIG. 6, to control portions of the drive mechanism 140. The drive spindles 162 and 164 are affixed to a pair of sleeve members 168 and 170 which slideably and rotatably extend through the latch plate 129. Since each of the spindles 162 and 164 are substantially identical, except for the switch 167 of the spindle 162 only the latter will be described. Hence, as shown in FIG. 5, the spindle 162 is carried by the sleeve member 168 which is biased rearwardly on the shaft 155 by a spring member 172. The spindle 162 is also splined to the shaft 155 as designated at 173 such that the spindle is axially displaceable with respect to the shaft. Consequently, each of the spindles follow the displacement of, and are carried into and out of, engagement with the cassette 10 responsive to operation of the latch mechanism 128.

As shown in FIGS. 5 and 6, the drive mechanism 140 includes a motor 174 which is adapted to drive each of the shafts 155 and 156 at appropriate intervals in the operation of the cassette 10. Pivotally mounted on the motor 174 is a swivel arm 175 which carries a driving gear 176 at its upper end. The arm 175 is coupled on one side 177 to a solenoid 178 which is, in turn, mounted on the viewer frame, by conventional means, not shown. The other side 179 of the arm 175 is coupled to a spring 180 which biases the arm 175 to the left, as shown in this figure, such that its driving gear 176 is in engagement with the gear 158 of the shaft 155. A belt 183 couples the driving gear 176 to the motor 174 and drives the gear 176 in a clockwise direction as shown.

In order to provide an appropriate clockwise motion to the gear 159 which controls the motion of the supply spool of the cassette 10, an idler gear 184 is placed in a position intermediate the gear 159 and the driving gear 176. Hence, when the idler gear 175 is pivoted to the right responsive to operation of the solenoid 148 as later explained, the continued clockwise operation of the driving gear 176 drives the gear 159 in a clockwise direction as shown.

In operation of the viewer 12, the swivel arm 175 is initially urged by the spring 180 to a position for take-up spool engagement as shown in bold lines in FIG. 6 to drive the film strip forward and then in accordance with energization of solenoid 178 is pivoted to a position shown in dotted lines for supply spool engagement to rewind the film strip. The solenoid 108 is electrially controlled by the motion sensing switch 167, which may, for example, be a centrifugal switch operative in accordance with shaft motion.

The switch 167 is adapted to energize solenoid 180 to pivot the arm 178 and its driving gear 176 out of engagement with the gear 158 and into engagement with the idler gear 184 once the forward motion of the cassette film is stopped, (responsive to reaching the trailing end of the film). That is, when motion of the spindle 162 ceases, switch 67 is operable to turn on the solenoid 180 which holds itself in this state until deactivated. Then at the end of rewind, once the motion of the spindle 162 ceases (in accordance with the stopping of the cassette spools when the leading end of the film is reached) the switch 167 again pulses the solenoid 180 to deactivate it and thereby allows the swivel arm 175 to again return to its forward drive position under the urging of spring 182. Hence, the drive mechanism 140 provides means cooperating with the cassette 10 for repeatedly transporting its film strip 37 first through a forward and then a rewind cycle. As later explained, if the cassette has been processed, the projection lamp 11 is energized during the forward run of this cycle to project images of the scenes recorded on the film strip 37.

The switch 167 is also connected through appropriate circuitry, not shown, to activate the cam motor 135 when the switch 167 is triggered at the end of rewind. For example, a suitable switch means may be included with or coupled to the solenoid 180 and configured to trigger the cam motor 135 into operation to release and eject the cassette 10 when the solenoid is released by the switch 67. Hence, the drive means 140 also includes means for terminating the transport cycle at the end of rewind.

As shown in FIG. 6, a pair of contacts designated 187 and 188 are positioned in the bottom 21 of the well 16 and adapted to connect the cassette terminals 123 and 124 to an appropriate process sensing circuit designated in block diagram form at 190. The latter circuit 190 is adapted to appropriately control the programming of the cassette 10 during its processing operation. That is, when the cassette 10 is unprocessed and continuity exists between the terminals 123 and 124, the circuit 190 through suitable switch means (not shown) interrupts the circuit and prevents operation of the lamp 11 during this first transport cycle of the film. Additionally, the motion detecting switch 67 is also connected through the circuit 190 to the cam motor 135 (see FIG. 5) to suitably control the release of the latch mechanism 128 at the end of the first rewind. Hence, the circuit 190, through suitable switch means, not shown, also interrupts this latter circuit when the cassette has not been previously processed. Since the continuity of the terminals 123 and 124 is disrupted just prior to the end of rewind and the second operation of the motion detector switch 167, the circuit 190 would include a delay circuit, not shown, which would continue to disrupt operation of the cam motor 135 for a short interval following opening of the terminals. Of course, once the forward motion of the film begins, the switch 167 is again placed in a passive state and a further signal will not be delivered to the cam motor 135 until the end of the following rewind.

The circuit 190 is also utilized to appropriately control portions of the transport cycle during processing. For example, the circuit 190 is coupled to the drive motor 174 to vary the rotation of the latter so as to particularly control the film speed during the processing rewind. Preferably, the motor 174, which may be a dc motor or the like, is controlled to provide a constant linear velocity to the film strip during the latter rewind operation.

The viewer 12 also includes a blinder arrangement, not shown, as for example, is described in the copending U.S. patent application of Edwin H. Land Ser. No. 174,375 entitled Photographic Processing and Projecting Apparatus and filed on Aug. 24, 1971 wherein blinders are automatically displaced across the aperture plate of the viewer during each rewind so as to provide a light-tight environment during processing operations.

The operation of the viewer 12 will now be explained. Following exposure of the film strip 37 in a camera, where in accordance with the single claw thereof the first elongated sprocket hole 44 will be in adjoining relation to the expose-project opening 70, the cassette 10 is then inserted in the well 16. Insertion compresses the eject springs 146 and 147 and triggers the switch 142. The latter triggers the cam motor 135 to rotate its cam 134 so as to displace the latching mechanism 128 to its latching position. Hence, the cam 134 displaces the latching shaft 130 laterally across the well 16 and into the cassette aperture 35 to cam the cassette 10 into its operative position where its opening 70 is in suitable overlying relation with the aperture plate (not shown) at the bottom of the well. Additionally, displacement of the latching assembly to its latching position also locks the eject mechanism 150 in its cocked position responsive to engagement of the shaft 137 with the eject arm 138.

As the latch mechanism 128 reaches its latching position, it carries the drive spindles 162 and 164 into engagement with the spool hubs 57 and 59 and triggers the switch 139 to energize the drive motor 174.

At this time, the swivel arm 175 is biased under spring 180 such that the driving gear 176 is in driving engagement with the gear 158 and consequently tends to drive the film strip 37 in a forward direction. Further, the double claw (not shown) of the viewer 10 displaces the film in a forward direction until the second elongated sprocket hole 45 is reached. During this forward drive of the film, the projection lamp 11 is held off by means of the process sensing circuit 190 responsive to the continuity between the cassette terminals 123 and 124 which are indicative of the unprocessed condition of the film strip 37. Once the elongated hole 45 is reached, substantially all of the film strip 37 will be wound on the take-up spool 54 and motion of the spindle shaft 162 will cease. This triggers its motion detector switch 167 which activates the solenoid 178 to draw the swivel arm to the right in FIG. 6 and displace its gear 176 into engagement with the idler gear 184. The latter drives the supply spool in a clockwise direction and rewinds the film strip 37 thereon.

During this rewind operation, the processing fluid is deposited on the film strip 37. In this regard, as previously indicated, insertion of the latching shaft 130 in the cassette aperture 35 engages the cam 114 which releases the processor arm 82 thereby enabling the processor 64. Then as the film is driven further forward to the trailing end, the bump 47 displaces the pressure pad assembly 102 into its film engagement position. As the supply spool 52 is driven clockwise responsive to counterclockwise motion of the idler gear 184, as just previously explained, the pod is opened and its fluid 77 is dumped to the nozzle 79 so as to coat the film during its passage thereby as it returns to the supply spool 52. Finally, as the leading end of the film 37 approaches the supply spool, the film aperture 49 engages the valve 109 and displaces it between the processor 64 and the pad assembly 102 to close off the nozzle and cam the pad out of film contact. Additionally, this valve displacement opens the contacts 123 and 124 and hence, triggers the process sensing circuit 190 to a project mode.

Once the rewind operation has been completed, the spool rotation ceases and the motion detector switch 167 of the spindle 162 is again actuated. This second actuation releases or deactivates the solenoid 178 which permits the swivel arm 175 to return to its forward drive position. At this time circuit 190 prevents actuation of the cam motor 135. However, since circuit 190 is now in a project condition, the projection lamp is then energized during the subsequent forward transport of the film so as to project the film images for viewing. Of course, as in conventional projectors, the viewer claw would also be in film engagement during this forward run to incrementally advance the film across the projection opening 70 of the cassette.

Following completion of the forward run of the film and the consequent stoppage of the take-up spindle 162, its motion detector switch 167 again triggers solenoid 178 to force arm 175 to its rewind position. Then upon completion of the rewind operation, and consequent stoppage of the spindle 162, its motion detector switch 167 releases the solenoid and, since it is now freed of the restraint of the sensing circuit 190, also actuates the cam motor 135 to return its cam 134 to the start position. Hence, the latter is rotated to withdraw the latching mechanism 128 from its latch position. This displacement of the latch 128 to its release position deactivates the switch 139 to shut off the drive mechanism 140 and also releases the arm 138 of the eject mechanism 150 which, under the forces of the eject springs 146 and 147, lifts the cassette 10 partially out of the well 16 where it is accessible to be grasped by the operator for removal. In this eject position, the cassette 10 will be disengaged from well switch 142 so that the viewer 12, which is automatically shut down as switch 142 is released and the motor 135 reaches its start position, will not be again energized unless the cassette 10 is again driven downwardly into the well 16.

Once the cassette 10 has been previously processed (previously inserted into and operated by the viewer 12) the terminals 123 and 124 will be open, and hence, will indicate a processed condition of the cassette. Consequently, when the latter is inserted in the well, the film 37, which was previously rewound to the supply spool, will be driven forward under normal projection conditions. Hence, the lamp 11 will be energized at this time since the process sensing circuit 190 responds to the open circuit (processed) condition of the terminals 123 and 124. Following the forward advancement, the film advancement is reversed responsive to the switch 167. At the end of rewind, responsive to the second actuation of the switch 167 which is also now free of restraint from the circuit 190, the latch mechanism 128 is withdrawn, the viewer is shut off and the cassette is ejected in accordance with the termination of operations previously explained in regard to shut down at the end of the second rewind occurring in the process and project operation.

Consequently, the viewer or projector apparatus is configured to automatically operate a processed cassette through a forward (project) and rewind cycle of the film. For unprocessed cassette, the apparatus automatically operates it through the same basic film transport cycle but without projection and with processing during rewind. Then the film transport cycle is essentially repeated but with projection during the forward run of the film strip. At the end of the rewind subsequent to projection the cassette is ejected and the viewer shut off. This is accomplished by a viewer apparatus configured to essentially operate the cassette through a forward and rewind cycle and then eject it. When the cassette is unprocessed, this cycle is repeated twice with modifications. Hence, when the cassette is unprocessed the eject which would normally occur at the end of the first rewind is in essence aborted and the film transport portion of the program is allowed to repeat. Further, the projection arrangements which are normally brought into operation during the first forward run are delayed until the second cycle.

It should be understood, of course, that the spool rotation may sometimes be momentarily interrupted as the spool waits for the claw to advance the next increment of film, etc. Consequently, the motion detector switch or its interconnected circuitry (not shown) with solenoid 179 is designed with conventional means, such as appropriate delay circuits, so as to avoid response to spool stoppage of very short duration.

Those familiar with the motion picture arts will readily appreciate the novel and highly unique advantages of this apparatus which provides substantially completely automatic operation of a multipurpose cassette. The apparatus is simply constructed to provide a fundamental cycle of the film through a forward and rewind operation followed by automatic shut down of the viewer. For the processing operation, in response to an indicating means of the cassette, this cycle is modified to eliminate projection during the first cycle and to repeat the cycle, essentially by preventing shut down of the viewer at the end of the first transport cycle. Means are also provided in a simplified compact arrangement for positively latching and locating the cassette in its operative position, for eliminating accidental interruption of initial processing and projection mode by the operator, and for terminating the operation of the viewer following completion of the required program. Further, the apparatus is energized by insertion of the cassette and following operation of the cassette alternatively through either of the preprogrammed operational sequences, the viewer is shut off and the cassette is partially ejected to permit grasping and removal of it by the operator. Consequently, a fully automatic apparatus is provided for processing and projection of a multipurpose cassette.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. Photographic projection apparatus for use with a cassette containing a first and second rotatably mounted spool and an elongated image-bearing film strip having its ends respectively connected to the spools and being initially substantially entirely coiled around said first spool, said apparatus comprising:

a housing having a slot formed therein, said slot being configured to have at least a major portion of the cassette inserted thereinto;

means within said housing fixedly located with respect thereto for receiving the cassette as it is inserted through said slot and locating the cassette at an operative position within said housing in alignment with said slot.

a pair of drive shafts initially positioned within said housing so as not to be contacted by the cassette as it is inserted through said slot into said receiving and locating means;

normally unenergized film image projection means;

means within said housing automatically responsive to the insertion of the cassette into said receiving and locating means for displacing said drive shafts from their said initial positions into respective engagement with the cassette's spools, means responsive to movement of said drive shafts into engagement with said spools; for energizing said film image projection means and for energizing said drive shaft engaged with said second cassette spool to facilitate the progressive advancement of the film strip into operative relationship with said film image projection means and the coiling of the film strip around said second cassette spool, and means for energizing said drive shaft engaging said first cassette spool to effect the return of the film strip to its original position within the cassette, for returning said drive shafts to their original positions within said housing, for deenergizing said drive shafts and said film image projection means and for displacing the cassette outwardly from its operative position within said housing through said slot, the initiation and termination of the entire operation and control of said apparatus thus being solely and completely responsive to the single manual step of an operator's inserting the cassette into said slot and said apparatus thus serving automatically to condition the cassette for repetitive such use in said apparatus prior to its automatically effecting said displacement of the cassette.

* * * * *